UNITED STATES PATENT OFFICE.

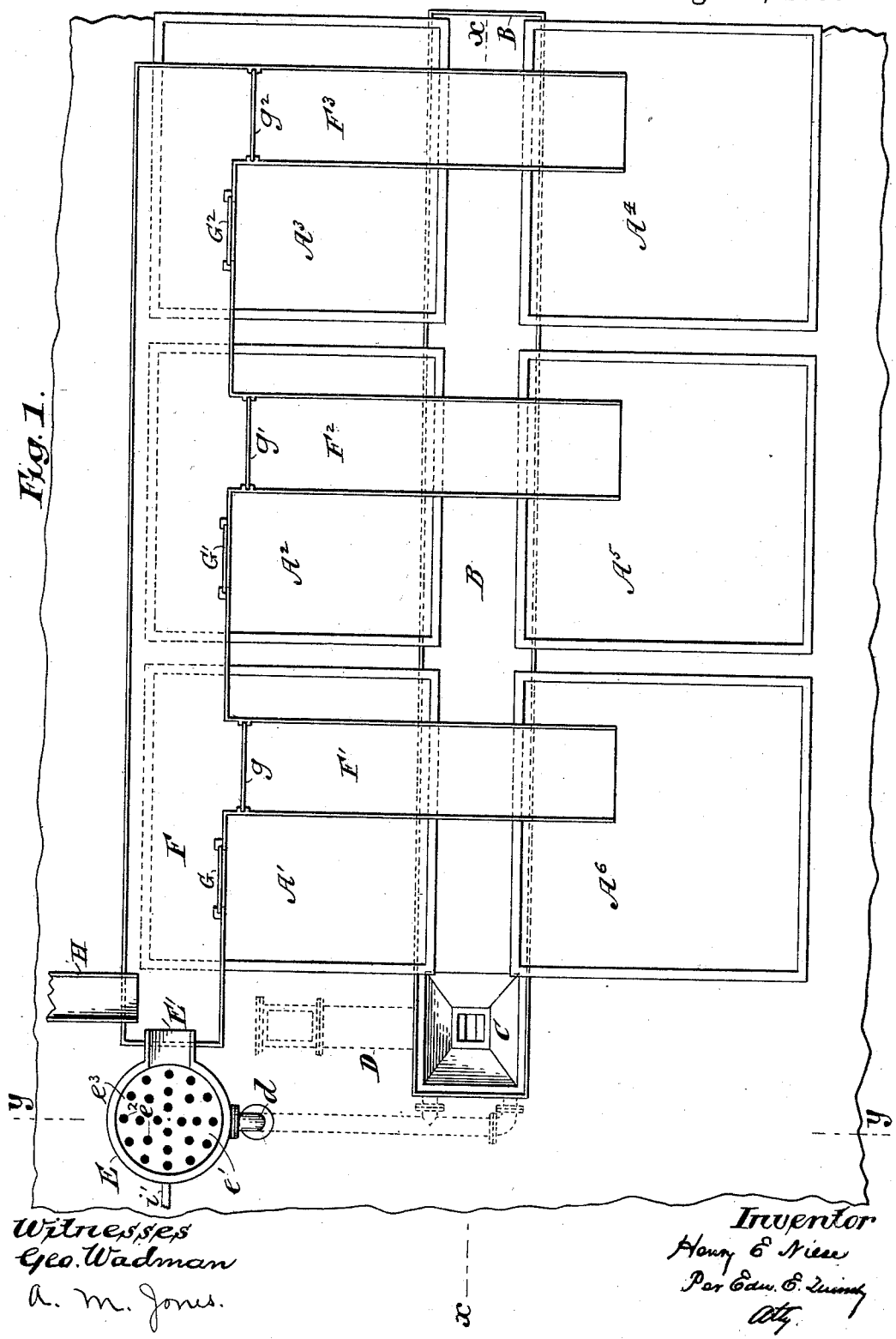

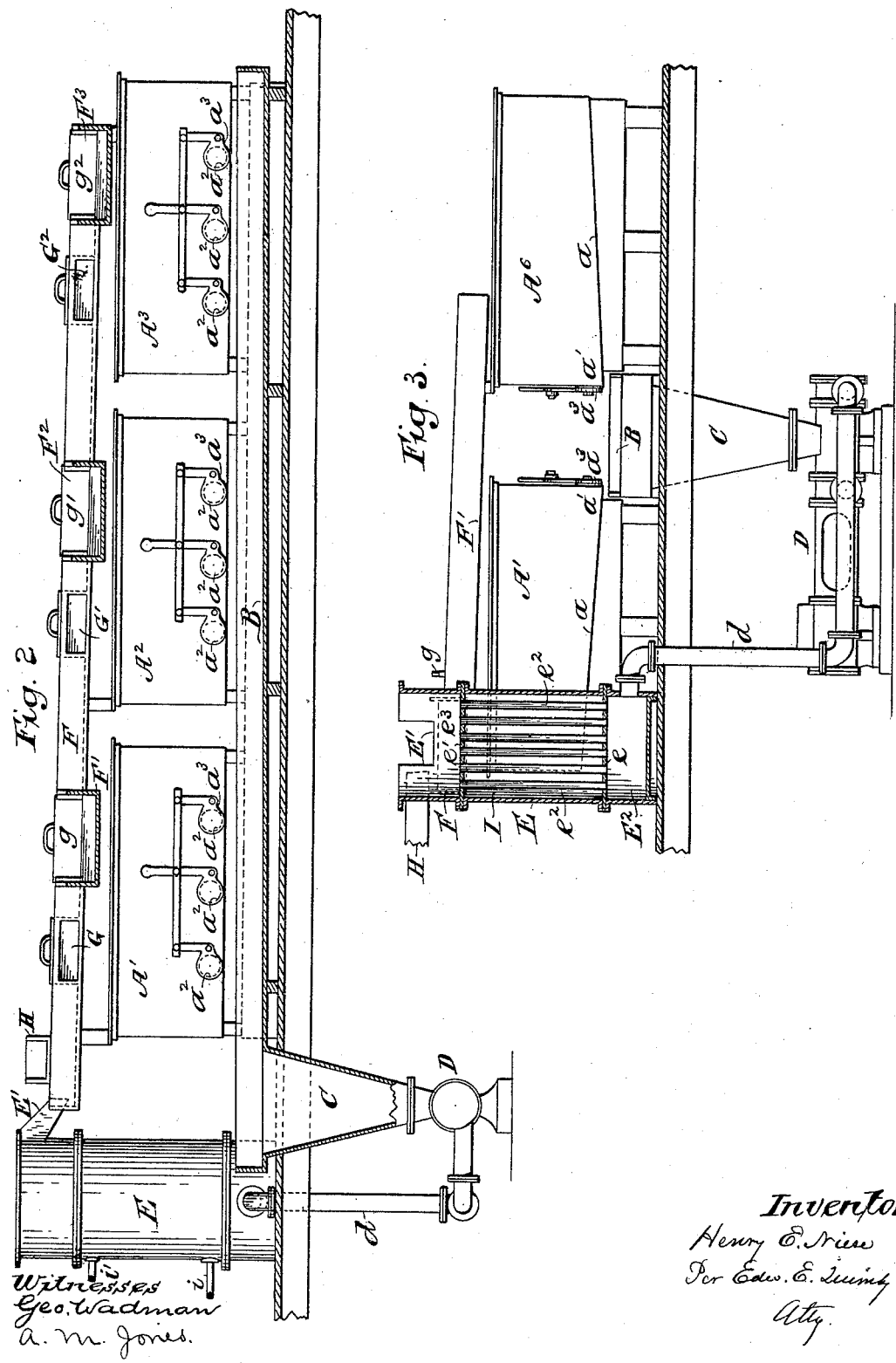

HENRY E. NIESE, OF JERSEY CITY, NEW JERSEY, ASSIGNOR TO THE F. O. MATTHIESSEN AND WIECHERS SUGAR REFINING COMPANY, OF SAME PLACE.

PROCESS OF REFINING SUGAR.

SPECIFICATION forming part of Letters Patent No. 409,333, dated August 20, 1889.

Application filed October 6, 1888. Serial No. 287,413. (No model.)

*To all whom it may concern:*

Be it known that I, HENRY E. NIESE, of Jersey City, New Jersey, have invented certain Improvements in the Process of Refining Sugar, of which the following is a specification.

This invention relates to a method of conducting the manufacture of refined sugar, by which crystallization is hastened and the product is not only improved in grade, but a larger amount of crystallized sugar is obtained from a given quantity of magma.

The invention consists in maintaining the magma in the crystallizing-tank at a temperature approximating 20° Fahrenheit by from time to time pumping or drawing off therefrom the liquid magma, and after bringing it to the desired temperature returning it to its place in the tank or supplying its place with other magma which has been brought to the desired temperature.

During the process of crystallization the portion of the magma not exposed to the air or to immediate contact with the bottom or walls of the crystallizing-tank tends to gradually rise in temperature. The resulting high temperature not only lessens the extent to which crystallization takes place, but darkens the crystallized sugar, and thus both diminishes the yield and lowers the grade of the product. It has heretofore been sought to avoid these difficulties by separating the magma into small masses preparatory to crystallization. To this end the magma is usually deposited in receptacles of small size, placed upon wagons, which, after the receptacles have been filled with magma, are wheeled into a cooling-room and allowed to remain for forty-eight hours or until crystallization has ceased. The contents of the receptacles after being, if necessary, warmed up to a higher temperature than that acquired in the cooling-room, are then removed into a centrifugal machine and drained. This method of operation requires much labor in handling, consumes a large amount of time, and does not entirely overcome the tendency of the magma to become heated during the process of crystallization. The present invention permits large crystallizing-tanks to be employed, and not only saves the labor of handling the magma in small quantities, but increases the yield and raises the grade of the crystallized product.

It will be obvious that a variety of forms of apparatus may be employed in carrying out the present invention. The essential characteristic of such apparatus is that it shall embrace means for removing a suitable portion of the magma from the crystallizing-tank and either cooling or heating the magma thus removed to the desired temperature and then returning it to the tank or supplying its place in the tank with other magma which is of the desired temperature.

A form of apparatus well adapted for the purpose, which is made the subject of a separate application, Serial No. 287,412, for a patent filed herewith, is illustrated in the accompanying drawings, which are as follows:

Figure 1 is a top view. Fig. 2 is a vertical section taken through the plane indicated by the line $x$ $x$ on Fig. 1. Fig. 3 is a vertical section taken through the plane indicated by the line $y$ $y$ on Fig. 1.

There are shown in the drawings a group of six crystallizing-tanks A' $A^2$ $A^3$ $A^4$ $A^5$ $A^6$. It will of course be understood that the number of tanks may be varied as desired. The crystallizing-tanks are alike in construction. Each tank has its bottom $a$ inclined toward its discharge end $a'$, where it is provided with any desired number of discharge-outlets $a^2$, furnished with suitable valves $a^3$. For convenience the crystallizing-tanks are placed in two groups of three each on opposite sides of the vertical plane of the receiving-trough B, which receives the magma discharged from the tanks when the valves $a^3$ are opened. The trough B is inclined and at its lower end discharges its contents into the well C, by which the magma is conducted to the magma-pump D. By means of the pump D the magma is forced upward through the pipe $d$ into the temperature-regulator E and thence into the main distributing-trough F, which is provided with branches F', $F^2$, and $F^3$ and with gates G G' $G^2$ and $g$ $g'$ $g^2$, by means of which the magma is distributed to the crystallizing-tanks, as may be required.

In operation the crystallizing-tanks are first charged with magma, which may be effected in any convenient way, as, for example, by the supply-chute H delivering the magma into the distributing-trough F. After crystallization begins the temperature of the magma in the tanks is kept under observation by means of suitable thermometers, and when it is seen that the temperature has risen to 120° Fahrenheit or upward the discharge-valves $a^3$ are opened and the uncrystallized magma is allowed to drain off into the receiving-trough B and thence down the well C to the pump D, by which it is pumped up into the temperature-regulator E, from which it is discharged through the chute E' into the distributing-trough F, and then, by a suitable adjustment of the gates is returned to such of the tanks as may have been partly drained. When the temperature of the room in which the operation is conducted is comparatively low, the mere exposure to the air which the magma encounters in its flow through the receiving-trough B may suffice to cool it to the desired temperature, in which case the temperature-regulator E serves merely as a part of the conduit through which the magma is forced upward by the operations of the pump D into the distributing-trough F. If, however, the magma is not sufficiently cooled by exposure to the air, the temperature-regulator E is brought into service as a further means of cooling it. To this end the temperature-regulator is constructed like an ordinary condenser. As will be seen on reference to Fig. 3, it is provided with two horizontal tube-sheets $e$ and $e'$, in which are inserted the opposite ends, respectively, of the vertical tubes $e^2$.

The magma driven upward by the pump D into the lower chamber $E^2$ of the temperature-regulator is forced therefrom upward through the tubes $e^2$ into the upper chamber $e^3$, from which it flows off by way of the chute E'. When the magma is to be cooled in its discharge through the temperature-regulator, a circulation of cold water is maintained through the space I around the tubes $e^2$ by means of the induction-pipe $i$ and the discharge-pipe $i'$. For this purpose the induction-pipe $i$ is so arranged as to be susceptible of connection with a reservoir of cold water. On the other hand, after crystallization has ceased, or, if from any cause prior thereto, the temperature acquired by the magma falls to an undesired extent, the temperature-regulator E is brought into service as a heater to raise the temperature of the magma passing through it, as may be required. To that end the induction-pipe $i$ is also so arranged as to be susceptible of connection with a reservoir of hot water or with a steam-boiler; hence in all cases the magma passed through the temperature-regulator, by being either cooled or heated, as desired, is returned to the crystallizing-tanks at the temperature which may be required in order to effect the desired cooling or heating of the magma in the crystallizing-tanks.

It will thus be seen that by this method the conditions of approximately uniform and comparatively low temperature, favorable to the promotion of crystallization, are effectively maintained throughout a large body of magma, and after crystallization has ceased the magma is, if required, warmed up to facilitate its final draining in the centrifugal machine.

What is claimed as the invention is—

The method of manufacturing crystallized sugar herein described, which consists in maintaining the magma in the crystallizing-tank at a temperature approximating 120° Fahrenheit during the process of crystallization by from time to time removing from the tank more or less of the liquid magma which is found to have risen to or above said temperature and introducing into the tank magma of lower temperature.

HENRY E. NIESE.

Witnesses:
HENRY C. WULP,
JNO. BENDER.